US006481862B1

(12) United States Patent
Lang et al.

(10) Patent No.: US 6,481,862 B1
(45) Date of Patent: Nov. 19, 2002

(54) LIGHTWEIGHT REARVIEW MIRROR ASSEMBLY

(75) Inventors: Heinrich Lang; Albrecht Popp, both of Ergersheim (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/652,297

(22) Filed: Aug. 29, 2000

(30) Foreign Application Priority Data

May 5, 2000 (DE) .......................................... 100 22 016

(51) Int. Cl.[7] .............................................. G02B 7/182
(52) U.S. Cl. ...................... 359/871; 359/872; 359/873; 359/874
(58) Field of Search ................................ 259/871, 872, 259/873, 874, 841, 850, 877, 854, 857; 248/479, 481, 482

(56) References Cited

U.S. PATENT DOCUMENTS

| 2,652,648 A | 9/1953 | Morley |
| 2,783,015 A | 2/1957 | Kampa |
| 3,189,309 A | 6/1965 | Hager |
| 3,291,435 A | 12/1966 | Herr |
| 3,339,876 A | 9/1967 | Kampa |
| 3,346,229 A | 10/1967 | Carson, Jr. |
| 3,371,903 A | 3/1968 | Thompson |
| 3,372,897 A | 3/1968 | Lee |
| 3,375,053 A | 3/1968 | Ward |
| 3,383,152 A | 5/1968 | Ward |
| 3,408,136 A | 10/1968 | Travis |
| 3,448,553 A | 6/1969 | Herr et al. |
| 3,476,464 A | 11/1969 | Clark |
| 3,508,815 A | 4/1970 | Scheitlin et al. |
| 3,522,584 A | 8/1970 | Talbot |
| 3,563,638 A | 2/1971 | Panozzo |

(List continued on next page.)

FOREIGN PATENT DOCUMENTS

| CA | 1095008 | 2/1981 |
| DE | 0590510 | 4/1994 |
| DE | 0865967 | 9/1998 |
| EP | 0761502 | 3/1997 |

OTHER PUBLICATIONS

German Search Report, May 10, 2001.
Verified English translation of EP 0761502, dated Mar. 12, 1997.
DE 197 11 547 corresponding to USSN 09/045,098, dated Mar. 21, 1997.
DE 44 29 604 A1 corresponding to USSN 08/804,205, dated Feb. 22, 1996.

Primary Examiner—Mohammad Sikder
(74) Attorney, Agent, or Firm—Dority & Manning, P.A.

(57) ABSTRACT

A rearview mirror assembly blowmolded carrier for vehicles and method of blowmolding the carrier are provided. The mirror assembly has a blowmolded carrier with a hollow space and a recess to affix a mirror element.

23 Claims, 5 Drawing Sheets

U.S. PATENT DOCUMENTS

Figure 2A:
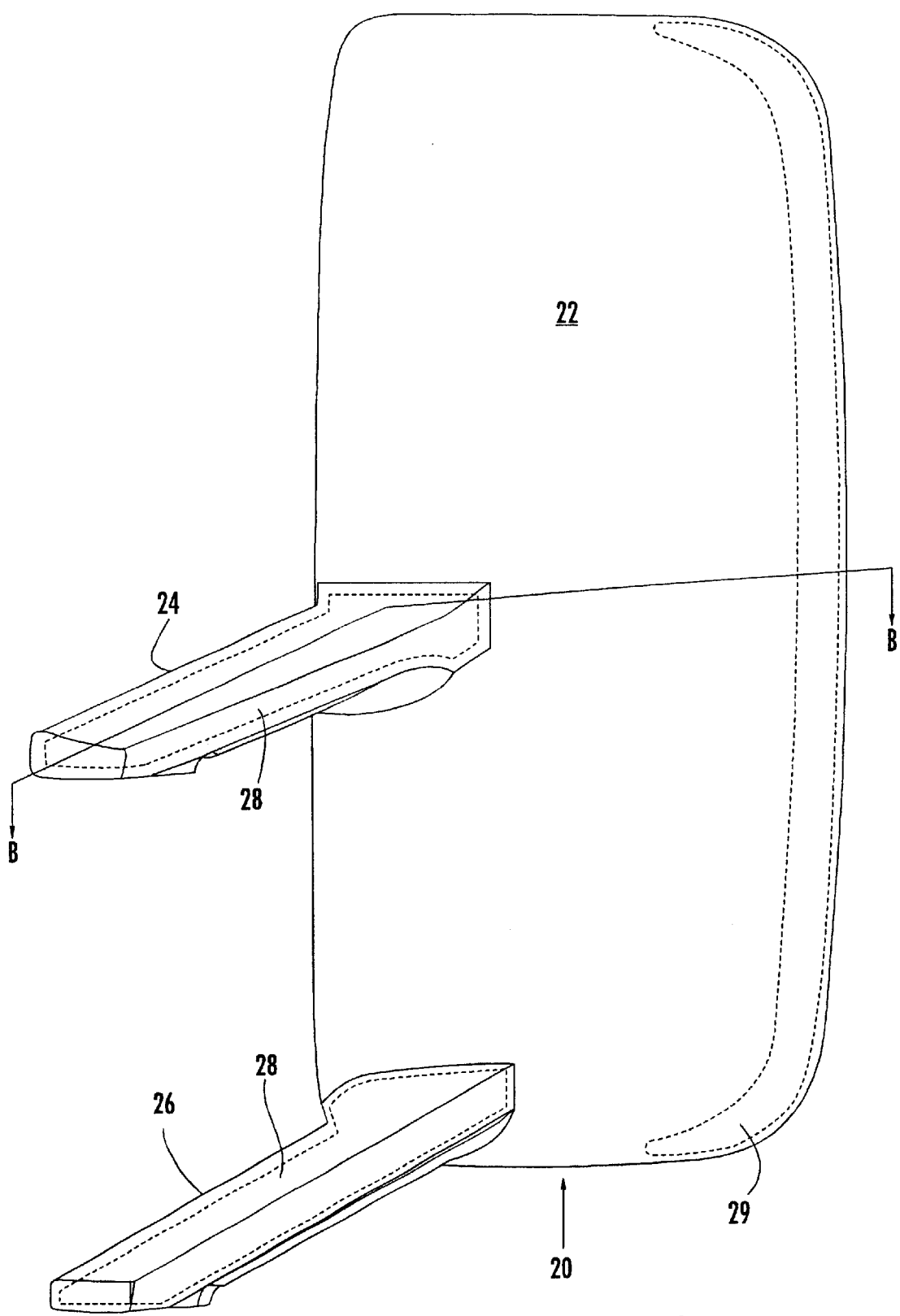

| | | |
|---|---|---|
| 3,659,929 A | 5/1972 | Yuzawa |
| 4,174,823 A | 11/1979 | Sutton |
| 4,488,778 A | 12/1984 | Polzer et al. |
| 4,517,151 A * | 5/1985 | Masumoto et al. ......... 264/540 |
| 4,740,068 A | 4/1988 | Fisher |
| 4,747,679 A | 5/1988 | Beach, Jr. |
| 4,883,349 A | 11/1989 | Mittelhauser |
| 4,915,493 A | 4/1990 | Fisher et al. |
| 4,929,074 A | 5/1990 | Urban |
| 4,957,359 A | 9/1990 | Kruse et al. |
| 4,988,178 A | 1/1991 | Eifert |
| 5,107,374 A | 4/1992 | Lupo et al. |
| 5,225,943 A | 7/1993 | Lupo |
| 5,268,795 A | 12/1993 | Usami |
| 5,295,021 A | 3/1994 | Swanson |
| 5,327,294 A | 7/1994 | Koske et al. |
| 5,493,828 A | 2/1996 | Rogowski et al. |
| 5,576,884 A | 11/1996 | Ise et al. |
| 5,604,644 A | 2/1997 | Lang et al. |
| 5,615,054 A | 3/1997 | Lang et al. |
| 5,621,577 A | 4/1997 | Lang et al. |
| 5,657,174 A | 8/1997 | Boddy |
| 5,721,646 A | 2/1998 | Catlin et al. |
| 5,760,980 A | 6/1998 | Lang |
| 5,786,948 A | 7/1998 | Gold |
| 5,880,895 A | 3/1999 | Lange et al. |

* cited by examiner

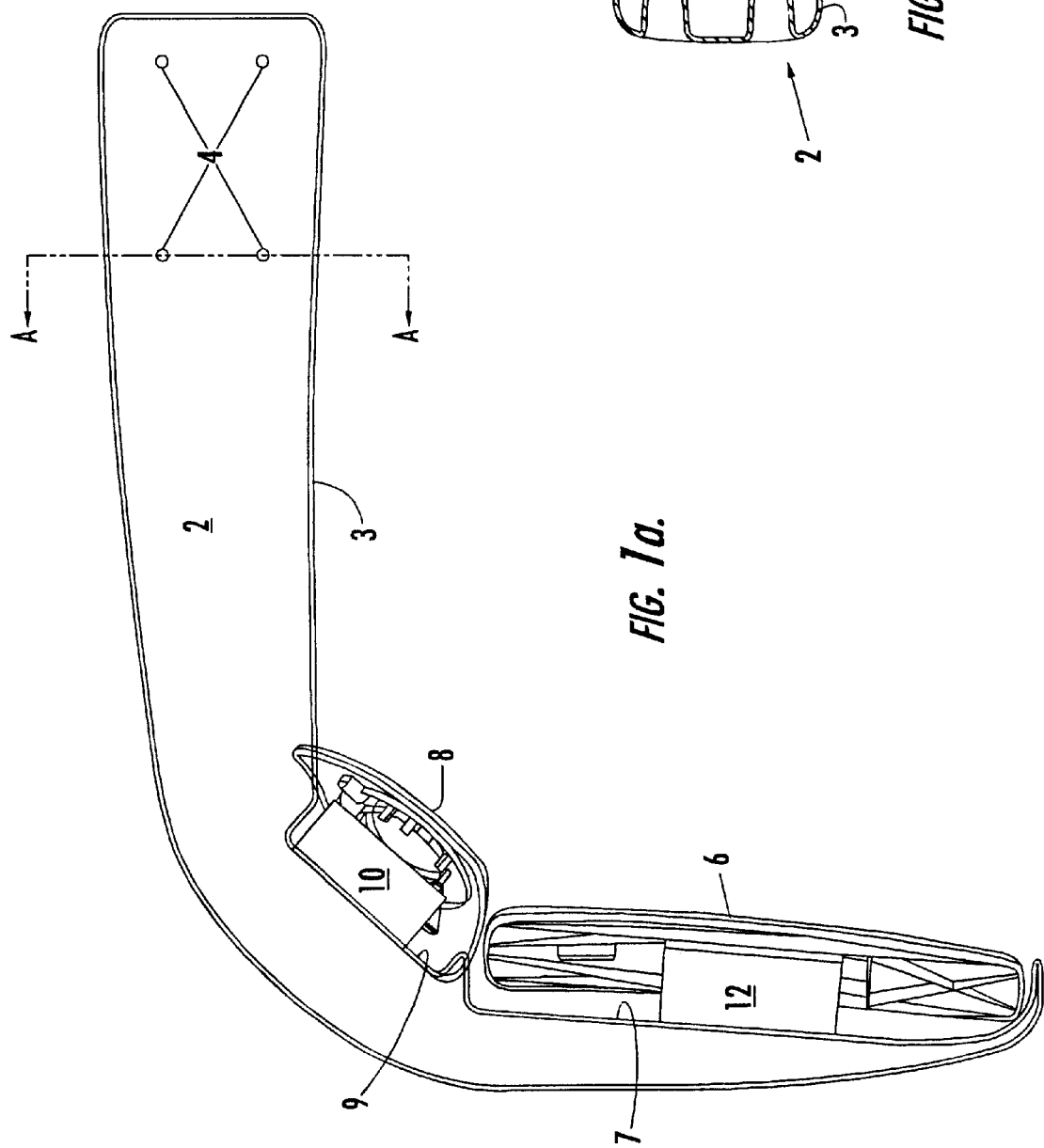

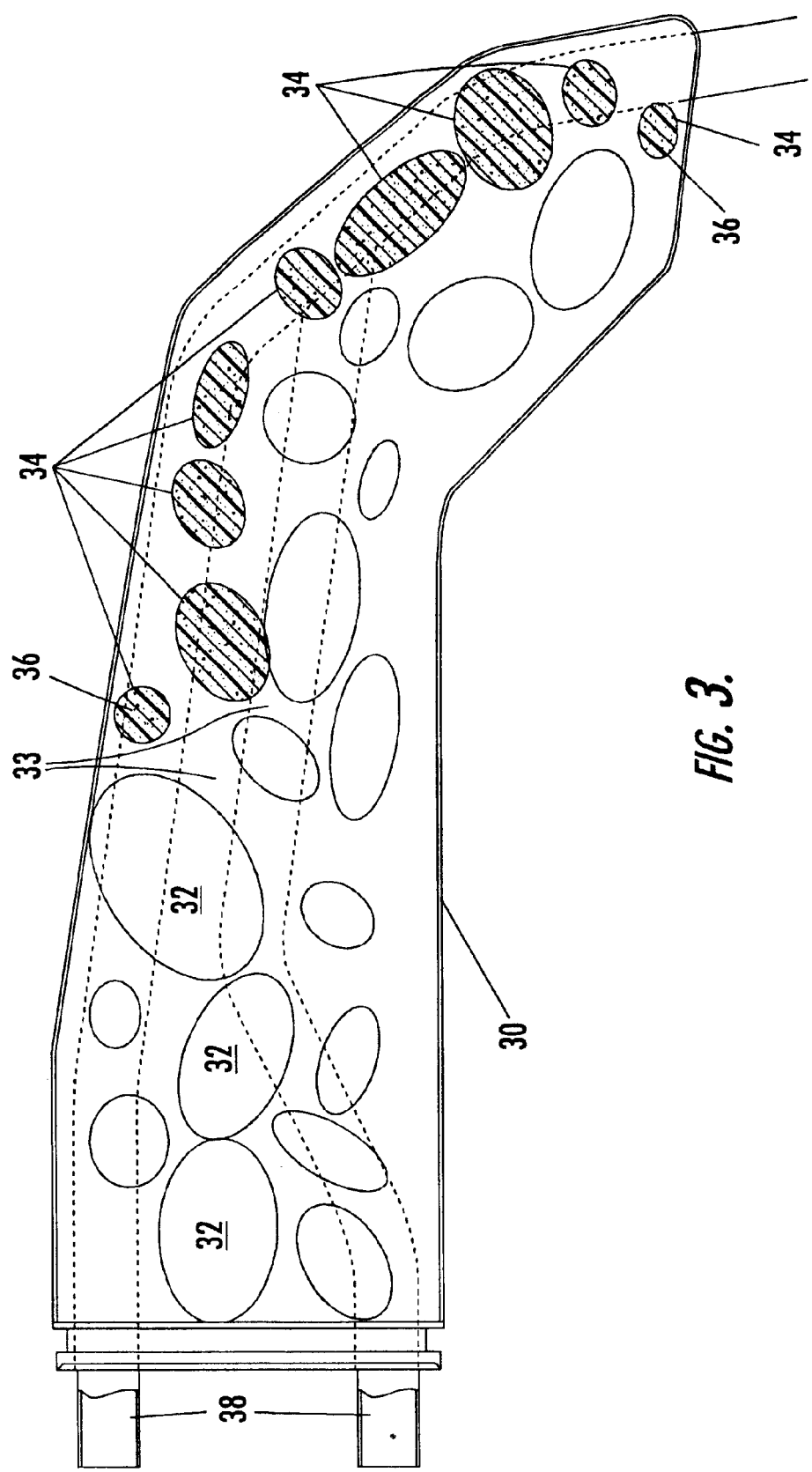

LIGHTWEIGHT REARVIEW MIRROR ASSEMBLY

The invention concerns a rear view mirror arrangement, especially an outside mirror for commercial vehicles in accord with the generic concept of Claim 1.

Outside mirrors of this kind and of variously different construction are already known in the present state of the technology. A mirror pane is adjustably affixed by a pivoting mechanism to a housing part, which part is appropriately connected to the body of the vehicle, allowing the mirror to swing in reference to the said housing part. The housing part is, as a rule, a solid plastic part, produced by injection molding. It is generally of a basin-like construction in which further mirror components or corresponding connection points for additions are installed. In particular, for large truck and bus mirrors, the carrying structure for outside mirrors is based on tubing or plates, which are affixed directly to the mirror holder which projects toward the vehicle body. This construction is disclosed by EP-A-0 590 510. The housing part serves, then as a covering of the back side of the mirror plate and supports the said pivoting mechanism The housing also provides a streamlined sheathing of the outside mirror. Such construction is extremely expensive and heavy.

A problem with this tube and plate construction is found in that relatively strong vibrations occur in the said rearview mirror assembly during the operation of the vehicle. In order to reduce these vibrations, EP 0 865 967 A2 proposes a carrying tube structure, encased in a foamed molded part. Again the disadvantage of this is, that the entire carrying structure is of excess weight.

A very light design, which is adaptable to smaller mirrors, is taught by DE 44 29 604 A1. In this case, the tube construction is fully dispensed with and the foam element itself remains as the support structure. For this purpose, a gradiated foam is employed as a one-piece element or the element can be composed of several shells.

Using EP 0 865 967 A2 as a starting point, it is thus the purpose of the present invention, to make available a sufficiently stable rearview mirror, which also offers the greatest possible reduction in vibration.

The achievement of this purpose is accomplished by the features of Claim 1.

Since, a blown, hollow plastic body, originating from a plastic blank, is used as a carrier, the result is a very light structure so that even in the case of a cantilevered mirror, or outboard carrier construction, the basic rigidity of the plastic hollow body assures a sufficient stability. At first, it appears doubtful that a blown plastic hollow body would exhibit sufficient stability to be used as a carrier for a rearview mirror arrangement for commercial vehicles. However, by means of the substantial reduction in the weight, the demands for achieving stability are likewise reduced, so that the result is, that a blown plastic hollow body does indeed offer sufficient stability.

Because of the fact that the plastic blank is made with varying wall thicknesses, the corresponding wall thickness of the finished carrier, that is, the plastic hollow body, can be controlled to specification for location and thickness. That is, the wall thicknesses of the carrier is increased in locations of high stress, i.e. at the point of juncture with the vehicle body, while the thicknesses in zones of lesser stress may be reduced. Also, a grid like rib structuring on the inner side of the plastic hollow body may be used to increase rigidity. (Claim 2)

In accord with a further advantageous embodiment of the invention, the plastic hollow body encompasses a multitude of hollow spaces, which are enhanced by, for instance, inset pieces or correspondingly designed bubble formations. By these measures, the stability is additionally increased and also the possibility exists to fill specified hollow spaces with filling materials. (Claim 3)

In accord with another advantageous embodiment of the present invention, the plastic hollow body is constructed in multiple layers, whereby, first, an increased stability is achieved, and second, outer layers can be provided, which are especially smooth and/or allow themselves to accept high quality lacquering. (Claim 4)

In accord with a further advantageous embodiment of the invention, the possibility exists of introducing, either in or to the hollow spaces, a stiffening structure whereby the rigidity of the carrier is additionally increased. (Claim 5)

In accord with a further advantageous embodiment of the invention, a filling material for the hollow spaces comprises plastic foam, such as poly-urethane (PU) foam a gradient foam or a mutlicomponent hard foam, which binds itself firmly to the inside wall of the hollow spaces and thus increases the stability of the carrier. Moreover, the harmonic vibratory properties of the carrier can be advantageously addressed by the appropriate choice of foam density or its degree of softness, so that on commercial driving the unavoidable vibrations are strongly damped and also as a result, less wear on the mirror assembly is incurred. (Claim 7)

Additionally or alternatively, there may be injected into a portion of the hollow spaces, or into various hollow spaces, a viscous fluid mass, for instance a gel or a gelatinous filling material which will also favorably affect specific vibratory and damping characteristics. (Claim 8)

In accord with a further advantageous embodiment of the invention, a granulate and/or sand may additionally or alternatively be placed in the hollow spaces. In this way, the fill material can comprise exclusively sand or granulate, or a mixture thereof or yet a mixture with the above described gel gelatine or foam. Once again, the stability is favored in a positive way and again the specific vibratory and damping characteristics can be advantageously controlled with attention to specifics. (Claim 9)

Further details, features and advantages of the invention will become evident from the following description of a preferred embodiment. The description is made with the aid of the drawing.

There is shown in:

FIG. 1a a schematic depiction of a first embodiment of the invention with a carrier in the form of a blown plastic hollow body with a single, continuous hollow space, FIG. 1b a section along the line A—A of FIG. 1, FIG. 2a a perspective view of a second embodiment of the invention, with a rearview mirror, which possesses a carrier in the form of two bearing arms.

Figure 2B:
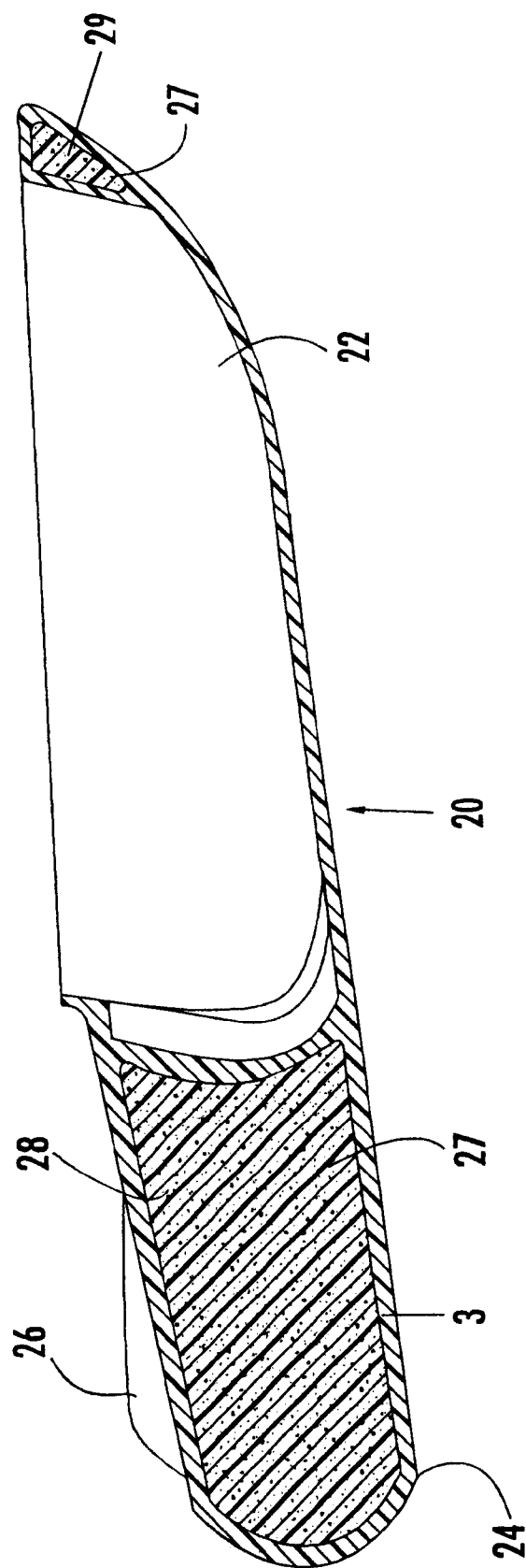

FIG. 2b a sectional view of the embodiment of FIG. 2a

Figure 4:
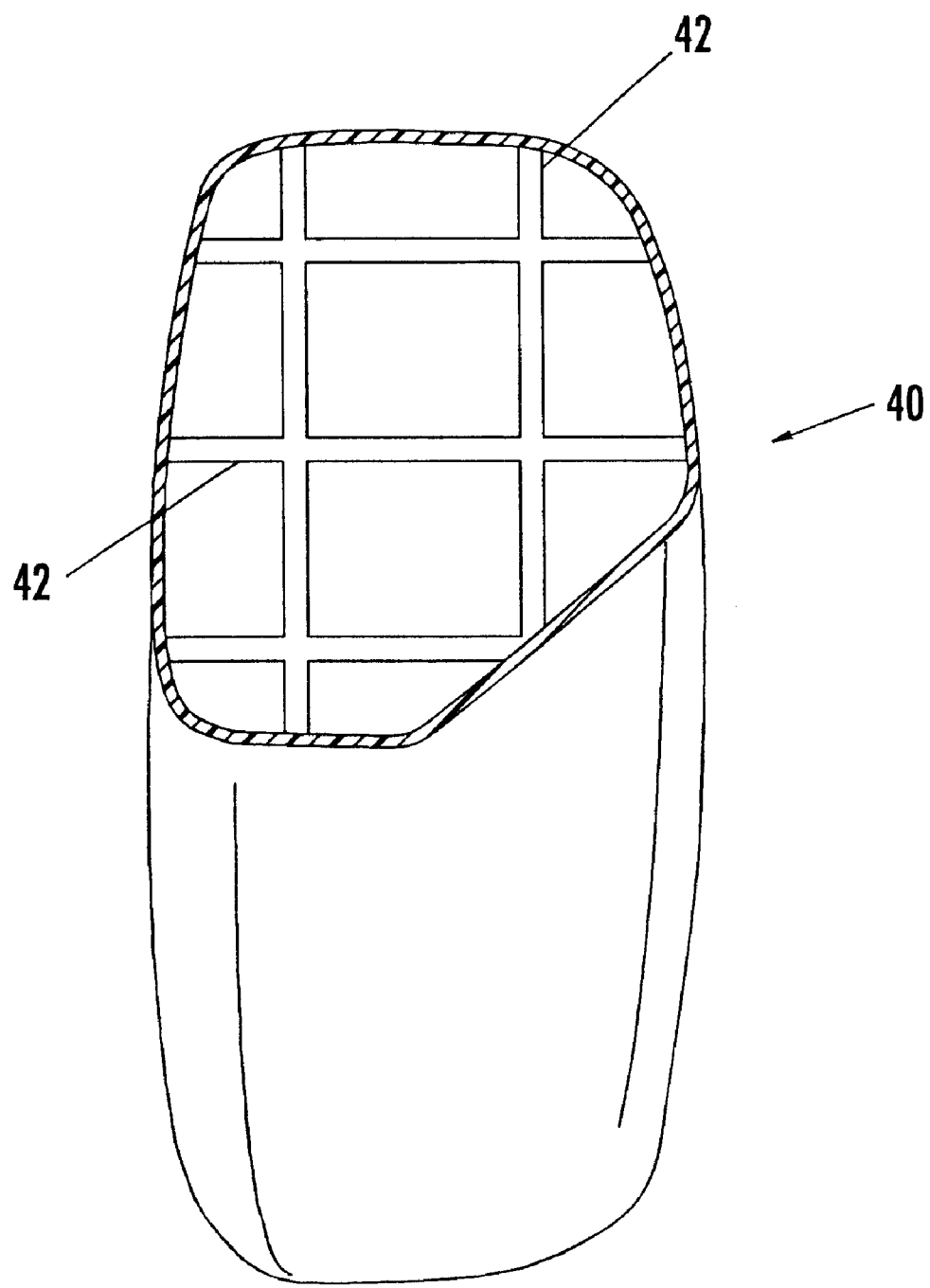

FIG. 3 a third embodiment of the invention with a carrier in the form of a plastic, hollow body with a multitude of hollow spaces, and FIG. 4 a fourth embodiment of the invention with a carrier comprised of a blown plastic hollow body with added means of rigidity.

FIGS. 1a and 1b schematically present a first embodiment of the invention. The rearview mirror arrangement encompasses a carrier 2 in the form of a plastic hollow body 2, blown from an extruded plastic blank and having a closed wall 3. On the vehicle end of the plastic hollow body 2, screw holes 4 are provided, in order to affix the carrier 2, i.e. the rearview mirror arrangement, to the vehicle body. On that end of the plastic hollow body 2, remote from the vehicle, are mounted in respective recesses a first mirror 6 and a second mirror 8. Both mirrors, 6 and 8 include, respectively, an adjusting mechanism 10 and 12, by means of which the said mirrors are secured to the plastic hollow body 2. The wall 3 of the plastic hollow body 2 is thicker at locations of higher stress than at locations of more moderate stress (not shown).

The FIGS. 2a and 2b show a second embodiment of the invention with a carrier 20 in the form of a hollow plastic body. The hollow plastic body 20 includes a shell shaped mirror housing 22 and two carrier arms, respectively 24 and 26, which are of one piece with the said mirror housing 22. The two carrier arms 24 and 26 are hollow, and exhibit respectively a hollow space 28 which is filled with a foam 27.

Preferably polyester urethane foam, gradient foam, multi-component foam and the like may be used as the filling material 27. The carrier 20 possesses, on the end of the mirror housing remote from the vehicle, an additional hollow space 29, the interior of which, likewise is filled with foam. By means of the filling the hollow spaces 28 and 29 with foam, first, the stability is improved, since th foam binds itself to the interiors of the walls in the hollow spaces 28 and 29, that is, adheres to the said walls. Second, because of the foam the vibratory characteristics are positively influenced, that is, the vibration is damped.

FIG. 3 shows a third embodiment of the invention with a carrier 30 in the form of a hollow plastic body, wherein the said hollow plastic body exhibits a plurality of bubble shaped hollow spaces 32 and 34. In this case, the bubble shaped hollow spaces 32 are empty, while the bubble shaped hollow spaces 34 are at least partially filled with a filling material 36. Because of the plurality of the hollow spaces 32, 34, first, the weight is reduced and second, by means of the walls between the hollow spaces 32, 34, the stability is increased. By means of the filling of a portion of the hollow spaces, namely the hollow space 34, with a filling material 36, the vibratory properties of the mirror assembly are influenced in such a way, that less vibration occurs, that is to say, the vibrations are damped. Claim 8). Additionally, in the case of the third embodiment, carrier arms 38 ar constructed of metal, by means of which the stability of the carrier 30 is additionally increased.

FIG. 4 shows a fourth embodiment of the invention, with a carrier 40 in the form of a plastic hollow body, by which on the interior walls of the plastic hollow body 40, grid type stiffening ribs 42 are provided. These grid shaped, stiffening ribs can be made by correspondingly different wall thicknesses in the plastic blank before the blowing of said body in the blow-mold. The said grid shaped stiffening ribs 42 also contribute to the increase of the stability of the carrier 30.

LIST OF REFERENCE NUMBERS

2 Carrier, hollow plastic body
3 Wall of 2
4 Screw holes
6 First mirror
8 Second mirror
10 Adjustment mechanism of first mirror
12 Adjustment mechanism of second mirror
20 Carrier, hollow plastic body
22 Mirror housing
24 Upper carrier arm
26 Under carrier arm
27 Filling material
28 Hollow space in 24, 26
29 Hollow space in 22
30 Carrier, hollow plastic body
32 Bubble shaped hollow space in 30, empty
34 Bubble-shaped hollow space in 30, full
36 Filling material
38 Carrier tubes
40 Carrier, hollow plastic body
42 Stiffening ribs

What is claimed is:

1. A rearview mirror assembly for a vehicle, comprising:
   a blowmolded carrier having a plurality of hollow spaces therein, the carrier having a proximal end for affixing the carrier to the vehicle and a distal end extending from the proximal end remote from the vehicle, the distal end having a recess thereon, at least one of the plurality of hollow spaces configured to be filled with a fill material; and
   a mirror element affixed to the recess.

2. The rearview mirror assembly as in claim 1, wherein the carrier is plastic.

3. The rearview mirror assembly as in claim 1, further comprising an attachment element affixed to the proximal end to attach the mirror assembly to the vehicle.

4. The rearview mirror assembly as in claim 3, wherein the attachment element has an opening therethrough for insertion of a screw, the attachment element, opening, and screw cooperating to attach the carrier to the vehicle.

5. The rearview mirror assembly as in claim 1, wherein the mirror element comprises a mirror and an adjusting mechanism for adjusting the mirror, the adjusting mechanism attached to the recess and the mirror adjustably attached to the adjusting mechanism.

6. The rearview mirror assembly as in claim 1, wherein the hollow space is a plurality of hollow bubbles.

7. The rearview mirror assembly as in claim 6, further comprising a fill material filling at least one of the bubbles.

8. The rearview mirror assembly as in claim 7, wherein the fill material is gelatin.

9. The rearview mirror assembly as in claim 7, wherein the fill material is a plastic foam.

10. The rearview mirror assembly as in claim 9, wherein the plastic foam is a gradient foam.

11. The rearview mirror assembly as in claim 9, wherein the plastic foam is polyurethane.

12. The rearview mirror assembly as in claim 7, wherein the fill material is granulate.

13. The rearview mirror assembly as in claim 12, wherein the fill material is sand.

14. The rearview mirror assembly as in claim 12, wherein the fill material is plastic granulate.

15. The rearview mirror assembly as in claim 7, wherein the fill material is gelatin and granulate.

16. The rearview mirror assembly as in claim 1, further comprising a supporting element attached within a first hollow space to the carrier.

17. The rearview mirror assembly as in claim 16, wherein the supporting element is comprised of tubes.

18. The rearview mirror assembly as in claim 16, wherein the supporting element is comprised of ribs.

19. The rearview mirror assembly as in claim 16, wherein the supporting element is comprised of tubes and ribs.

20. The rearview mirror assembly as in claim 1, further comprising a carrier arm unitarily constructed with the carrier, the carrier arm having a second hollow space therein.

21. The rearview mirror assembly as in claim 20, wherein the carrier arm is substantially perpendicular to and extending from the carrier opposite the recess.

22. The rearview mirror assembly as in claim 20, further comprising a dividing wall and at least one other hollow bubble within the second hollow space.

23. The rearview mirror assembly as in claim 22, further comprising a fill material filling the at least one other bubble, the fill material in stiffening, fixed communication with the carrier.

* * * * *